US006997652B2

(12) United States Patent
Budde et al.

(10) Patent No.: US 6,997,652 B2
(45) Date of Patent: Feb. 14, 2006

(54) DEVICE FOR PRODUCING DEEP-HOLE BORINGS IN WORKPIECES HAVING A CONVEX SURFACE

(75) Inventors: Dirk Budde, Remscheid (DE); Andreas Quak, Erkrath (DE)

(73) Assignee: Honsberg Lamb Sonderwerkzeugmaschinen GmbH, Remscheid (DE)

( * ) Notice: Subject to any disclaimer, the term of this patent is extended or adjusted under 35 U.S.C. 154(b) by 347 days.

(21) Appl. No.: 10/333,341

(22) PCT Filed: Jul. 17, 2001

(86) PCT No.: PCT/EP01/08214

§ 371 (c)(1),
(2), (4) Date: Jul. 11, 2003

(87) PCT Pub. No.: WO02/05995

PCT Pub. Date: Jan. 24, 2002

(65) Prior Publication Data

US 2004/0101375 A1 May 27, 2004

(30) Foreign Application Priority Data

Jul. 18, 2000 (DE) .............................. 100 34 776

(51) Int. Cl.
*B23B 49/02* (2006.01)

(52) U.S. Cl. ...................... 408/59; 408/97; 408/115 B
(58) Field of Classification Search ............. 408/72 B, 408/97, 103, 115 R, 115 B, 56, 57, 59, 241 B
See application file for complete search history.

(56) References Cited

FOREIGN PATENT DOCUMENTS

| DE | 3036995 | * | 4/1982 |
| DE | 19613443 | * | 10/1997 |
| DE | 29907963 | * | 9/1999 |
| FR | 2575095 | * | 6/1986 |
| JP | 59-118307 | * | 7/1984 |
| JP | 59-232707 | * | 12/1984 |
| JP | 62-181809 | * | 8/1987 |
| JP | 62-264813 | * | 11/1987 |
| JP | 3-281111 | * | 12/1991 |
| JP | 7-40114 | * | 2/1995 |
| JP | 2001-259950 | * | 9/2001 |

* cited by examiner

*Primary Examiner*—Daniel W. Howell
(74) *Attorney, Agent, or Firm*—Diller, Ramik & Wight

(57) ABSTRACT

The drill bit (14) passes through a drilling bush (2) for guiding said drill bit. The drilling bush (22) is pressed against the workpiece (10). However, the drilling bush does not terminate flush with the workpiece, but comprises a linear supporting edge (28) that overlaps the apex of the curvature of the workpiece. This prevents the drilling bush from sliding off a curvature of the workpiece surface.

11 Claims, 3 Drawing Sheets

DEVICE FOR PRODUCING DEEP-HOLE BORINGS IN WORKPIECES HAVING A CONVEX SURFACE

BACKGROUND OF THE INVENTION

The invention refers to a device for producing deep-hole borings in metal workpieces having a convex surface, and in particular to a device where an elongate drill bit is guided by a drilling bush.

In general, bores are referred to as deep-hole borings when their depth is more than about 10 times their diameter. For example, deep-hole borings form oil channels extending in crank shafts, or cooling water channels in cylinder heads. A machine tool for producing deep-hole borings in crank shafts is described in DE 299 07 963 U1, for example. This device comprises elongate drill bits, each passing through a drilling bush, the drilling bush being independently guided and adapted to be set against the workpiece. Here, the drilling bush is advanced so far that the front face abuts the workpiece. In crank shafts, the respective oil channels extend obliquely to the main axis of the crank shaft from one main bearing to the adjacent stroke bearings or transversely through the main bearings. The boring ends often are not located on the apex of the respective bearings, but laterally thereof. The borings extend under complex spatial angles to the main axis of the workpiece.

Deep-hole drilling is effected using a cutting liquid supplied at a high pressure of about 80 bar. The cutting liquid flows through a longitudinal channel within the drill, exits from the drill tip and then flows back through an outer channel together with the drill chips. The drilling bush is designed such that it is flush with and in full surface contact with the surface of the workpiece so that the drilling liquid flowing back on the outside is returned through the drilling bush. In prior art, a dedicated drilling bush is used for each boring, the front end face of the bush being formed spatially such that it intimately contacts the surface of the workpiece. Since oil channels in crank shafts have different angles and terminate at different locations in the bearings, each oil channel often requires another drilling bush. This is a considerable effort and necessitates a repeated change of the drilling bush.

BACKGROUND OF THE INVENTION

It is the object of the invention to provide a drill device with a drilling bush that is can be used independent of the shape of the workpiece so that different workpieces and different borings can be produced using the same drilling bush.

The object is solved according to the invention. Accordingly, the drilling bush is not adapted to the workpiece, but comprises a substantially straight supporting edge by which it is supported on the convex surface of the workpiece. Thus, a full-surface and sealing support at the boring edge is consciously omitted and it is accepted that drilling liquid can escape laterally at the place of contact between drilling bush and workpiece. By the substantially straight supporting edge it is achieved that the drilling bush always contacts the surface of the workpiece with the supporting edge, even when the boring is produced laterally of the apex. Thus it is avoided that two curvatures or inclined surfaces of the workpiece and the drilling bush are pressed against each other which would slide on each other and slip off due to their inclined surfaces. Preferably, the device is used to produce borings in cylindrical surfaces. Then, the supporting edge extends obliquely or rectangularly to the longitudinal axis of the workpiece and rests on the apex line of the workpiece. There is no risk of slipping off. The apex is that point of the sectional plane of the tube that, in parallel to the drilling bush axis, projects furthest towards the axis drilling bush.

Usually, drilling bushes include a wear resistant bush at the front end. Typically, the bush projects slightly so that it forms the part that should be adapted to the surface of the workpiece. The wear resistant bush is made of wear resistant steel or hard metal. In the device of the present invention, the bush need not project beyond the drilling bush but may be sunk completely in the drilling bush. Further, the wear resistant bush need not be adapted to the workpiece. The functionality of the bush is reduced to guiding the drill bit. The bush has no sealing function.

The invention allows for the use of a single drilling bush for different angles and different workpiece surfaces.

According to a preferred development of the invention, the supporting edge is delimited by a planar side surface of the drilling bush. The planar side surface facilitates the provision of a straight supporting edge at the front end.

The end of the drilling bush facing the workpiece may be designed in part as a planar front face or in part as a receding inclined surface, the supporting edge defining the planar front face. The receding inclined surface increases the opening for the escape of the outflowing drilling liquid. Due to the fact that the drilling liquid escapes into the environment before reaching the drilling bush, the chips in the drilling liquid do not enter the drilling bush and also cause no wear in the same. This prolongs the service life of the drilling bush.

Suitably, two parallel supporting edges are provided extending on either side of the longitudinal bore of the drilling bush. Thus, the drilling bush may selectively be inclined to the right or the left and otherwise maintain its orientation.

Preferably, the supporting edge is rounded or beveled. A substantially point-shaped contact between the drilling bush and the surface of the workpiece is obtained. This contact is sufficient for a stable guiding and security against displacement, in particular due to the fact that the point of contact lies on the apex of the workpiece and a slipping off along an inclined surface is not possible.

The following is a detailed description of an embodiment of the invention with reference to the accompanying drawings.

DESCRIPTION OF THE PREFERRED EMBODIMENTS

Figure 1:
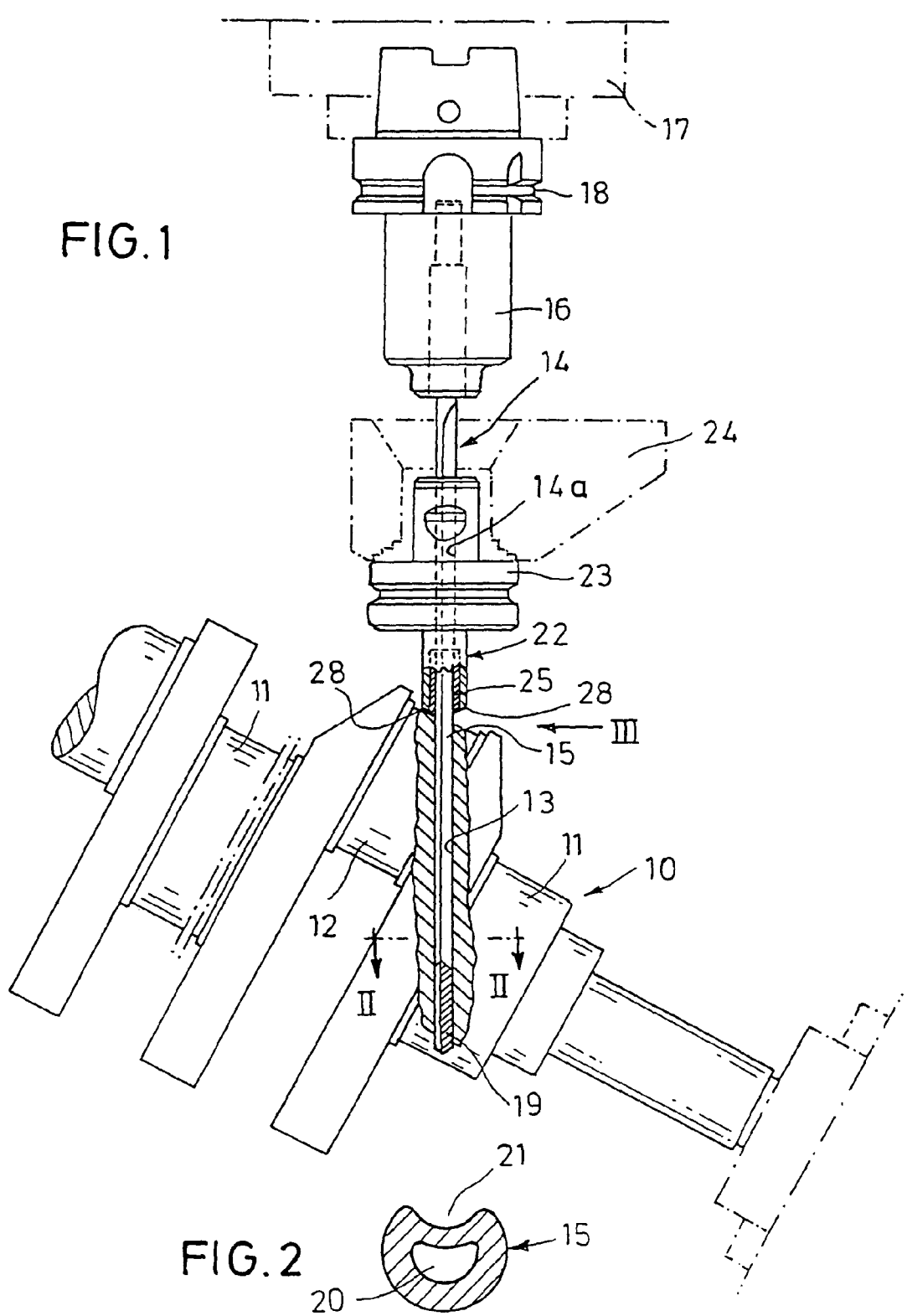
FIG. 1 is a schematic illustration of the production of an oil channel in a crank shaft.

In the present embodiment, the workpiece 10 is a crank shaft with main bearings 11 and side bearings 12 offset therefrom. An oil channel 13 is to be drilled between a side bearing 12 and a main bearing 11. The channel extends under a spatial angle in the crank shaft, i.e. it has an axially directed component and it extends laterally beside the axes of the stroke bearing 12 and the main bearing 11 (cf. FIG. 3).

Figure 2:
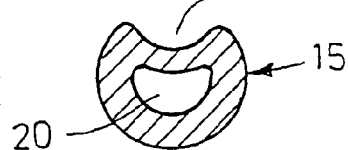
FIG. 2 is a cross section of the shaft of the drill bit along line II—II of FIG. 1.

The drill 14 has an elongate drill shaft 15, the rear end of which is fastened in a tool holder 16 set into a chuck 17 of the machine tool. The tool holder 16 has a gripping groove 18 for an automatic tool changing device to engage. At the front end of the shaft 15, a drill bit 19 of hard metal is provided. The cross section of the shaft 15 is represented in FIG. 2. The shaft has an inner longitudinally extending channel 20 through which drilling liquid supplied to the machine tool 17 flows to the front end of the shaft 15, takes the drill chips along and flows back in a laterally open outer channel 21 also extending in the longitudinal direction of the shaft 15.

Figure 4:
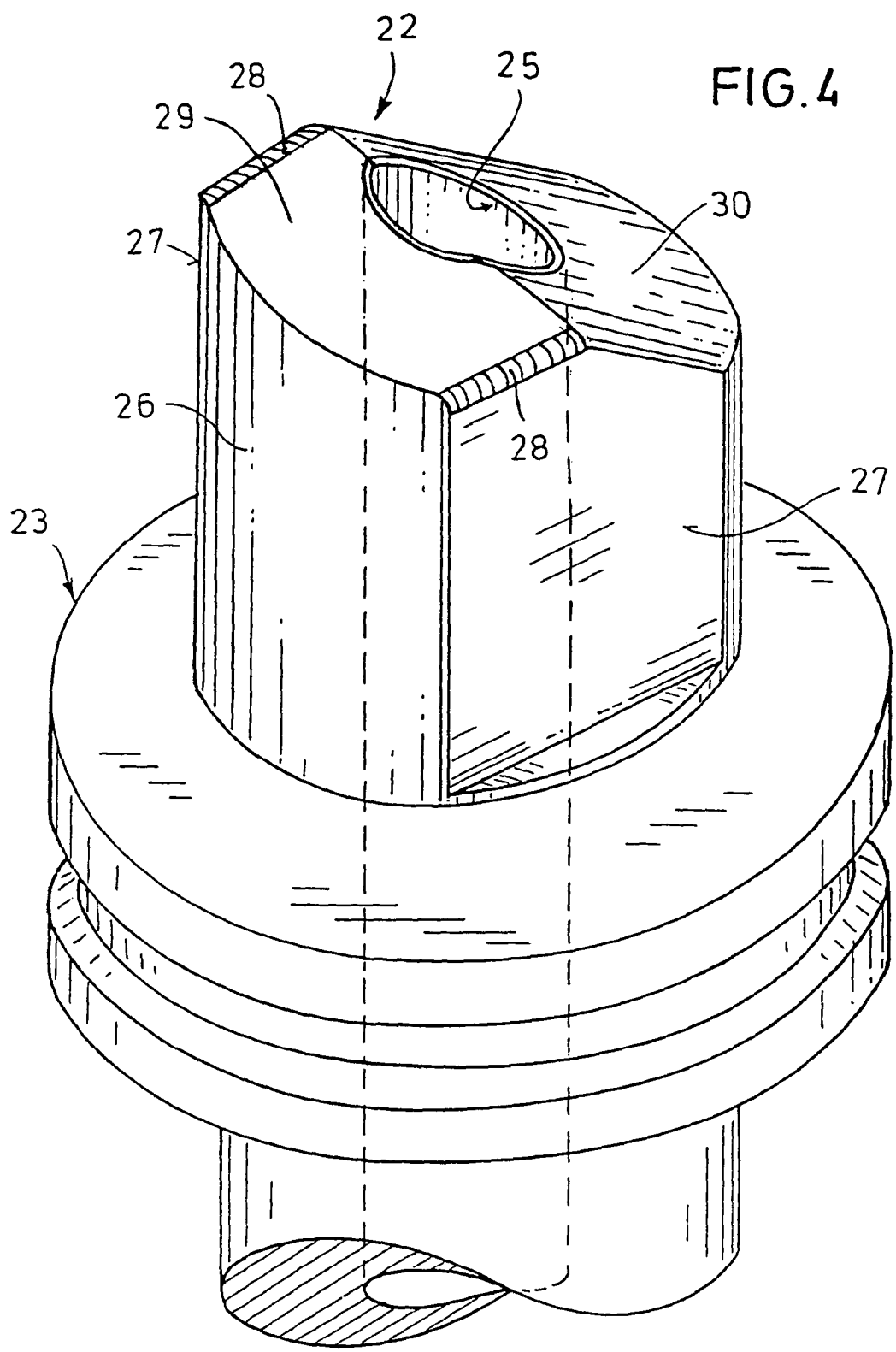
FIG. 4 is a perspective illustration of the drilling bush.

The drilling bush 22 serves to guide the drill 14. The drilling bush 22 is provided with a gripping ring 23 having a gripping groove and it may be moved independently of the drill 14 by a moving device 24. The drilling bush 22 comprises a longitudinally extending channel 14a through which the shaft 15 extends. At the front end of the channel 14a, a wear resistant bush 25 of high-strength steel or hard metal is provided. The bush 25 is entirely sunk into the drilling bush 22 and its front end is flush with the drilling bush as is particularly evident from FIG. 4.

The drilling bush 22 has a generally cylindrical shaft 26 having opposite sides provided with two planar side surfaces 27 as flattened portions. The front ends of the planar side surfaces 27 form straight supporting edges 28 extending in parallel to each other. The supporting edges 28 delimit a planar front end face 29 extending perpendicular to the axial direction of the shaft 26 and passing into an inclined surface 30 receding continuously from the front end face 29. The inclined surface 30 extends beyond the central axis of the bush 25. It serves to let returning drilling liquid escape laterally.

Figure 3:
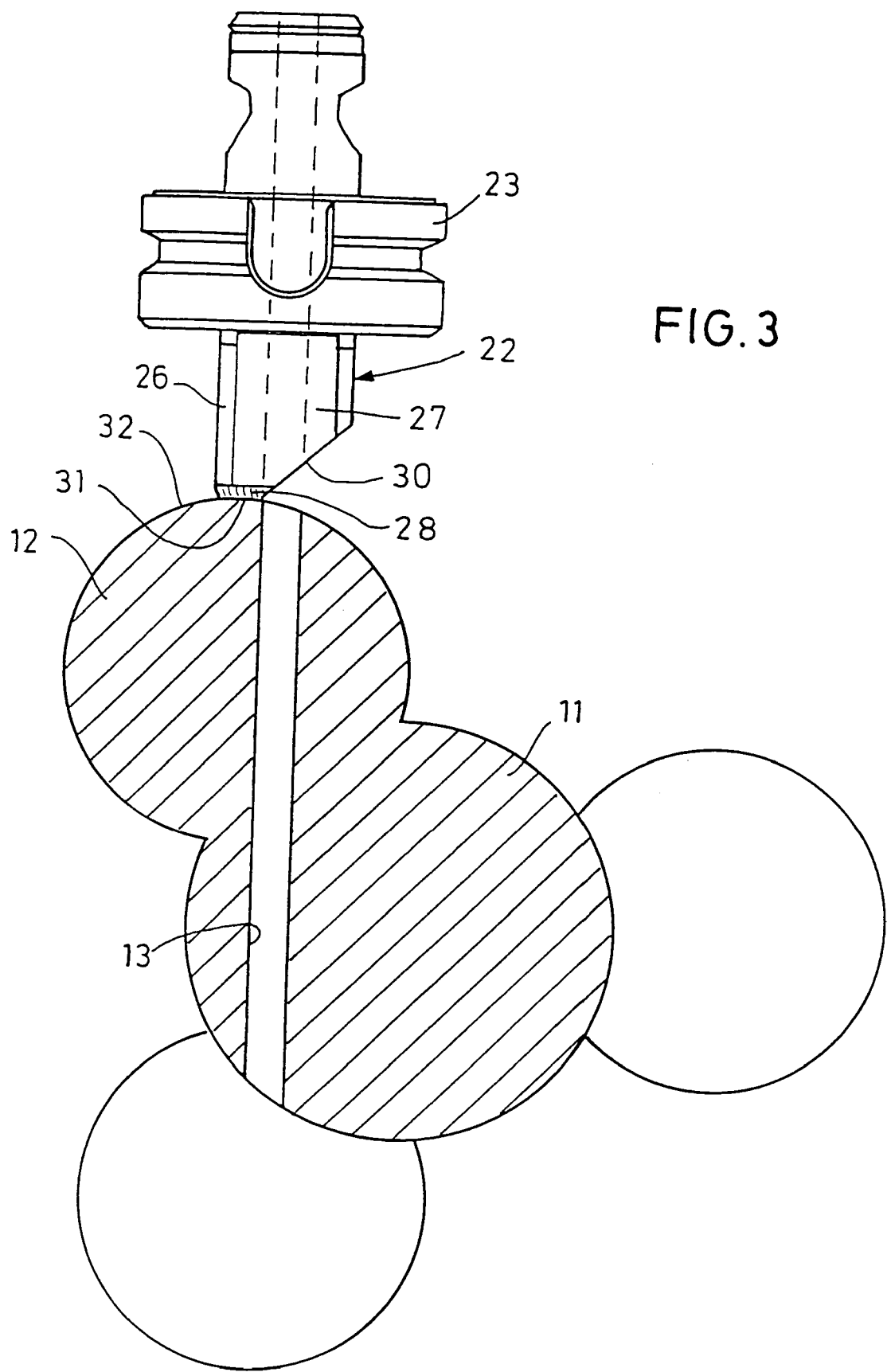
FIG. 3 is an enlarged view of FIG. 1 in the direction of the arrow III.

In the present case, the supporting edges 28 are curved, i.e. they are designed as cylindrical surfaces. As illustrated in FIG. 3, in use, the supporting edges 28 are oriented transversely to the longitudinal axis of the side bearing 12 whose surface forms the convex surface 32 of the workpiece to be machined on. The apex 31 of the workpiece is the point which, with respect to the longitudinal axis of the drilling bush 22, is closest to the drilling bush. As shown, the supporting edge 28 crosses the apex 31 and contacts the same in a point-shaped manner. Therefore, the drilling bush cannot slip off from the apex 31 to the right or the left. The boring 13 extends laterally from the apex 31. During operation, the drilling bush 22 is urged axially forward by a pressing force, the supporting edge 28 pressing against the apex 31.

It is evident that the same drilling bush 22 is useful without modification fro different inclined bores and different workpieces. Thus, it is a universal drilling bush.

Although a preferred embodiment of the invention has been specifically illustrated and described herein, it is to be understood that minor variations may be made in the apparatus without departing from the spirit and scope of the invention, as defined by the appended claims.

What is claimed is:

1. A device for producing inclined deep-hole borings in metal workpieces with a convex surface, comprising an elongate drill bit (14) having an inner (20) and an outer longitudinally extending channel (21) and a drilling bush (22) through which the drill bit (14) passes and which includes a wear resistant bush (25), characterized in that the end of the drilling bush (22) facing the workpiece (10) comprises at least one straight supporting edge (28) extending transversely to the drilling bush axis.

2. The device of claim 1, characterized in that the supporting edge (28) defines a planar side surface (27) of the drilling bush (22).

3. The device of claim 1, characterized in that the end of the drilling bush (22) facing the workpiece (10) is designed in part as a planar front end face (29) and in part as a receding inclined surface (30), where the supporting edge (28) defines the planar front end face (29).

4. The device of claim 1, characterized in that two parallel supporting edges (28) are provided.

5. The device of claim 1, characterized in that the supporting edge (28) is rounded or beveled.

6. The device of claim 2, characterized in that the end of the drilling bush (22) facing the workpiece (10) is designed in part as a planar front end face (29) and in part as a receding inclined surface (30), where the supporting edge (28) defines the planar front end face (29).

7. The device of claim 2, characterized in that two parallel supporting edges (28) are provided.

8. The device of claim 3, characterized in that two parallel supporting edges (28) are provided.

9. The device of claim 2, characterized in that the supporting edge (28) is rounded or beveled.

10. The device of claim 3, characterized in that the supporting edge (28) is rounded or beveled.

11. The device of claim 4, characterized in that the supporting edge (28) is rounded or beveled.

* * * * *